(12) United States Patent
Liao et al.

(10) Patent No.: US 7,897,442 B2
(45) Date of Patent: Mar. 1, 2011

(54) METHOD FOR FABRICATING PIXEL STRUCTURE

(75) Inventors: Ta-Wen Liao, Hsinchu (TW);
Chih-Chun Yang, Hsinchu (TW);
Ming-Yuan Huang, Hsinchu (TW);
Han-Tu Lin, Hsinchu (TW);
Chih-Hung Shih, Hsinchu (TW);
Chin-Yueh Liao, Hsinchu (TW);
Chia-Chi Tsai, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 196 days.

(21) Appl. No.: 12/105,278

(22) Filed: Apr. 18, 2008

(65) Prior Publication Data

US 2009/0148987 A1 Jun. 11, 2009

(30) Foreign Application Priority Data

Dec. 10, 2007 (TW) ................ 96147035 A

(51) Int. Cl.
*H01L 21/00* (2006.01)
(52) U.S. Cl. ................ 438/151; 257/E21.001
(58) Field of Classification Search ........... 438/30, 438/129, 34, 599, 609, 158, 151, 149; 257/E33.065, 257/E21.002, E21.001, E21.411, E29.147, 257/E21.414
See application file for complete search history.

(56) References Cited

U.S. PATENT DOCUMENTS

| 2004/0129943 | A1 | 7/2004 | Yoo et al. | |
|---|---|---|---|---|
| 2006/0099747 | A1* | 5/2006 | Park | 438/158 |
| 2006/0119779 | A1* | 6/2006 | Chang et al. | 349/149 |

FOREIGN PATENT DOCUMENTS

| CN | 1728363 | 2/2006 |
|---|---|---|
| CN | 101013655 | 8/2007 |
| JP | 2000181077 | 6/2000 |

* cited by examiner

*Primary Examiner* — Charles Garber
*Assistant Examiner* — Stanetta D Isaac
(74) *Attorney, Agent, or Firm* — Jianq Chyun IP Office

(57) ABSTRACT

A method for fabricating a pixel structure is disclosed. A substrate is provided. A first conductive layer is formed on the substrate, and a first shadow mask exposing a portion of the first conductive layer is disposed over the first conductive layer. Laser is used to irradiate the first conductive layer for removing the part of the first conductive layer and forming a gate. A gate dielectric layer is formed on the substrate to cover the gate. A channel layer is formed on the gate dielectric layer over the gate. A source and a drain are formed on the channel layer and respectively above both sides of the gate. A patterned passivation layer is formed to cover the channel layer and expose the drain. An electrode material layer is formed to cover the patterned passivation layer and the exposed drain.

21 Claims, 16 Drawing Sheets

METHOD FOR FABRICATING PIXEL STRUCTURE

CROSS-REFERENCE TO RELATED APPLICATION

This application claims the priority benefit of Taiwan application serial no. 96147035, filed on Dec. 10, 2007. The entirety the above-mentioned patent application is hereby incorporated by reference herein and made a part of specification.

BACKGROUND OF THE INVENTION

1. Field of the Invention

The present invention generally relates to a method for fabricating a pixel structure, and more particularly, to a method for fabricating a semiconductor layer by a laser ablation process.

2. Description of Related Art

A display functions as an interface between man and machines in addition to displaying images, wherein a flat display plays a major role in development tendency of the display technology today. A flat display is mainly categorized into organic electroluminescence displays (OELDs), plasma displays, and thin film transistor liquid crystal displays (TFT LCDs), wherein the TFT LCD is counted as the most popular one. In general, a TFT LCD is mainly composed of a thin film transistor array substrate, a color filter substrate and a liquid crystal layer. The TFT array substrate includes a plurality of scan lines, a plurality of data lines and a plurality of pixel structures arranged in array, and each pixel structure is respectively electrically connected to a corresponding scan line and a corresponding data line.

FIGS. 1A-1G are diagrams showing a conventional method for fabricating a pixel structure. Referring to FIG. 1A, a substrate 10 is first provided and then a gate 20 is formed on the substrate 10 by using a first photolithography and etching process. Next, as shown in FIG. 1B, a gate dielectric layer 30 is formed on the substrate 10 to cover the gate 20. Next, as shown in FIG. 1C, a channel layer 40 is formed over the gate 20 and on the gate dielectric layer 30 by using a second photolithography and etching process. Next, as shown in FIG. 1D, a source 50 and a drain 60 are formed on a partial region of the channel layer 40 and a partial region of the gate dielectric layer 30 by using a third photolithography and etching process. Usually, the channel layer 40 is made of amorphous silicon (a-Si). In order to reduce the contact impedances between the channel layer 40 and the source 50, and between the channel layer 40 and the drain 60, an ion doping process is conducted on the a-Si surface to form an N-type doping region.

Next, as shown in FIG. 1D, the source 50 and the drain 60 are respectively extended from both sides of the channel layer 40 onto the gate dielectric layer 30 and expose a partial region of the channel layer 40. Next, as shown in FIG. 1E, a passivation layer 70 is formed on the substrate 10 to cover the gate dielectric layer 30, the channel layer 40, the source 50 and the drain 60. Next, as shown in FIG. 1F, a fourth photolithography and etching process is used to pattern the passivation layer 70 so as to form a via hole H in the passivation layer 70. As shown in FIG. 1F, the via hole H in the passivation layer 70 exposes a portion of the drain 60. Moreover, as shown in FIG. 1G, a fifth photolithography and etching process is used to form a pixel electrode 80 on the passivation layer 70. As shown in FIG. 1G, the pixel electrode 80 can be electrically connected to the drain 60 through the via hole H. The fabrication of a pixel structure 90 is accomplished when the pixel electrode 80 has been formed.

As described above, a conventional pixel structure 90 is fabricated mainly by using five photolithography and etching processes. In other words, five photolithography and etching processes with different patterns are required for fabricating the pixel structure 90. Since the cost of each photo-mask used in the photolithography and etching process is quite high and therefore the fabrication cost can be significantly reduced by decreasing the number of the photolithography and etching processes.

In addition, along with increasing size of a TFT LCD panel, the photo-mask size for fabricating the TFT LCD panel is accordingly larger. A photo-mask with large dimension would be even higher, thus, the fabrication cost of the pixel structure 90 cannot be reduced.

SUMMARY OF THE INVENTION

Accordingly, the present invention is directed to a method for fabricating a pixel structure which is capable of reducing fabrication cost.

The present invention provides a method for fabricating a pixel structure. First, a substrate is provided and a first conductive layer is formed on the substrate. Next, a first shadow mask is disposed over the first conductive layer, wherein the first shadow mask exposes a portion of the first conductive layer. Next, a laser is applied to irradiate the first conductive layer through the first shadow mask so as to remove the portion exposed by the first shadow mask of the first conductive layer and form a gate. Next, a gate dielectric layer is formed on the substrate to cover the gate. Next, a channel layer is formed on the gate dielectric layer. Next, a source and a drain are formed on the channel layer and at both sides above the gate; the gate, the channel layer, the source and the drain together constitute a TFT. Moreover, a patterned passivation layer is formed on the TFT to cover the channel layer and expose the drain. Finally, an electrode material layer is formed to cover the patterned passivation layer and the exposed drain, and the patterned passivation layer is used to pattern the electrode material layer to form a pixel electrode.

According to an embodiment of the present invention, the patterned passivation layer is baked so as to make the top-surface of the patterned passivation layer is protruded out of the sidewall of the patterned passivation layer. In an embodiment, the top-surface of the patterned passivation layer is transformed into, for example, a mushroom-like shape.

According to an embodiment of the present invention, the patterned passivation layer is removed after forming the pixel electrode.

According to an embodiment of the present invention, a method of forming the channel layer includes, for example, forming a semiconductor layer on the substrate, followed by patterning the semiconductor layer to form the channel layer. In another embodiment, a method of forming the channel layer includes, for example, forming a semiconductor layer on the substrate, followed by providing a second shadow mask placed over the semiconductor layer, wherein the second shadow mask exposes a portion of the semiconductor layer. Next, a laser is applied through the second shadow mask to irradiate the semiconductor layer so as to remove the partial semiconductor layer exposed by the second shadow mask.

According to an embodiment of the present invention, a method of forming the source and the drain includes, for example, forming a second conductive layer on the channel layer and the gate dielectric layer, followed by patterning the second conductive layer to form the source and the drain.

According to an embodiment of the present invention, the channel layer, the source and the drain are simultaneously formed. In an embodiment, a method of forming the channel layer, the source and the drain includes, for example, as follows. First, a semiconductor layer is formed on the gate dielectric layer. Next, a third conductive layer is formed on the semiconductor layer. Next, a photoresist layer is formed on the third conductive layer over the gate, wherein the photoresist layer is divided into a first photoresist block and a second photoresist block located at both sides of the first photoresist block. According to an embodiment, the thickness of the first photoresist block is less than the thickness of the second photoresist block. Next, a first etching process is performed on the third conductive layer and the semiconductor layer using the photoresist layer as a mask. Next, the photoresist layer is reduced until the first photoresist block is completely removed. Next, a second etching process is performed on the third conductive layer using the remained second photoresist block as a mask so that the remaining third conductive layer forms the source and the drain, while the semiconductor layer forms the channel layer. According to another embodiment, a method of forming the channel layer, the source and the drain includes, for example, forming a semiconductor layer on the gate dielectric layer. Next, a second conductive layer is formed on the semiconductor layer. Next, a photoresist layer is formed on the second conductive layer over the gate, wherein the photoresist layer can be divided into a first photoresist block and a second photoresist block located at both sides of the first photoresist block, wherein the thickness of the first photoresist block is less than the thickness of the second photoresist block. Next, using the photoresist layer as a mask, a first etching process is performed on the second conductive layer and a second etching process is performed on the semiconductor layer. Then, the thickness of the photoresist layer is reduced until the first photoresist block is completely removed. Next, by using the remaining second photoresist block as a mask, a third etching process is performed on the second conductive layer and a fourth etching process is performed on the semiconductor layer. The remaining second conductive layer constitutes the source and the drain, and the semiconductor layer constitutes the channel layer.

A method of forming the first photoresist block and the second photoresist block of the photoresist layer includes, for example, a halftone photo-mask process or a graytone photomask process. In another embodiment, a method of forming the first photoresist block and the second photoresist block of the photoresist layer may also include, for example, irradiating the photoresist layer by using a laser through a shadow mask to form the first and second photoresist blocks. In addition in other embodiments, a method of fabricating the channel layer, the source and the drain includes: forming an ohmic contact layer on the surface of the semiconductor layer after forming the semiconductor layer. Next, a first etching process and a second etching process are respectively performed to remove the ohmic contact layer exposed by the second photoresist block. A method of reducing the thickness of the photoresist layer includes an ashing process.

According to an embodiment of the present invention, a method of forming the patterned passivation layer includes: for example, forming a passivation layer on the TFT after forming the TFT, and patterning the passivation layer. In another embodiment, a method of forming the patterned passivation layer includes, for example, forming a passivation layer on the TFT after forming the TFT, and providing a third shadow mask over the passivation layer, wherein the third shadow mask exposes a portion of the passivation layer. Next, a laser is applied through the third shadow mask to irradiate the passivation layer to remove the portion of the passivation layer exposed by the third shadow mask.

According to an embodiment of the present invention, the patterned passivation layer includes a patterned passivation layer formed on a portion of the gate dielectric layer.

According to an embodiment of the present invention, the material of the patterned passivation layer includes organic photoresist material.

According to an embodiment of the present invention, the method of forming the conductive layer includes performing a sputtering process to form an indium tin oxide layer (ITO layer), an indium zinc oxide layer (IZO) layer, or high transparent material.

According to an embodiment of the instant application, the laser dose used to irradiate the semiconductor layer is between 10 and 500 mJ/cm$^2$. In addition, the laser wavelength is between 100 nm and 400 nm.

According to an embodiment of the present invention, the gate and a lower-layer capacitor electrode are simultaneously formed, and the source, the drain and an upper-layer capacitor electrode are simultaneously formed, wherein the lower-layer capacitor electrode and the lower-layer capacitor electrode together serve as the electrodes of a storage capacitor.

According to above description of the present invention, the patterned passivation layer is used to pattern the conductive layer to form a pixel electrode. Therefore, the method for fabricating a pixel structure according to the present invention is simplified compared to the prior art. Besides, shadow mask used in the laser ablation process is simpler, as compared to the conventional photo-masks, and therefore significantly reduces the overall fabrication cost.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present preferred embodiments of the invention, examples of which are

The First Embodiment

Figure 1A:
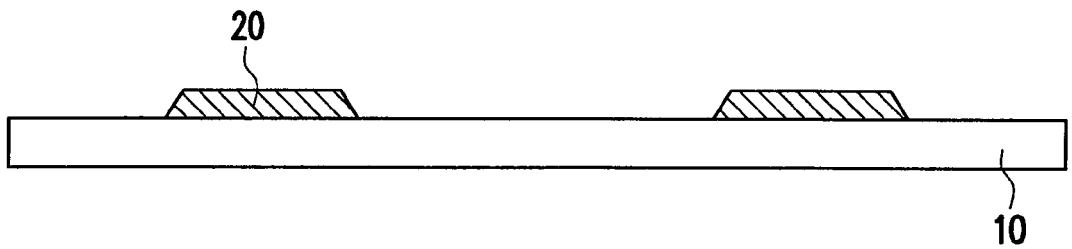
FIGS. 1A-1G are diagrams showing a conventional method for fabricating a pixel structure.
Figure 1B:
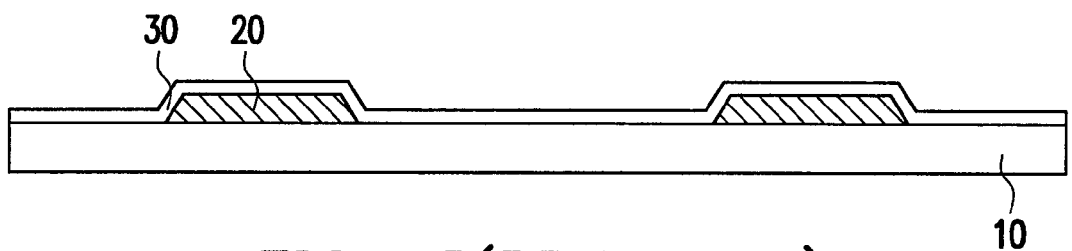
Figure 1C:
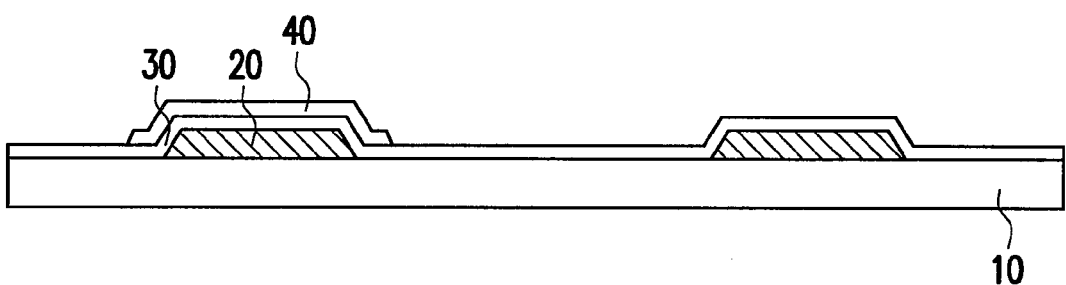
Figure 1D:
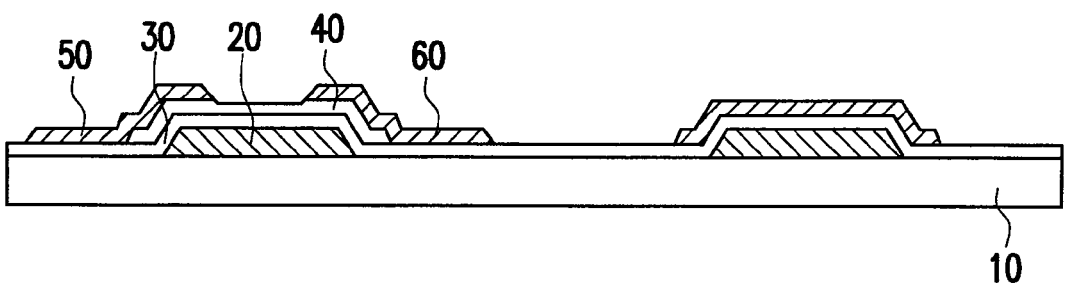
Figure 1E:
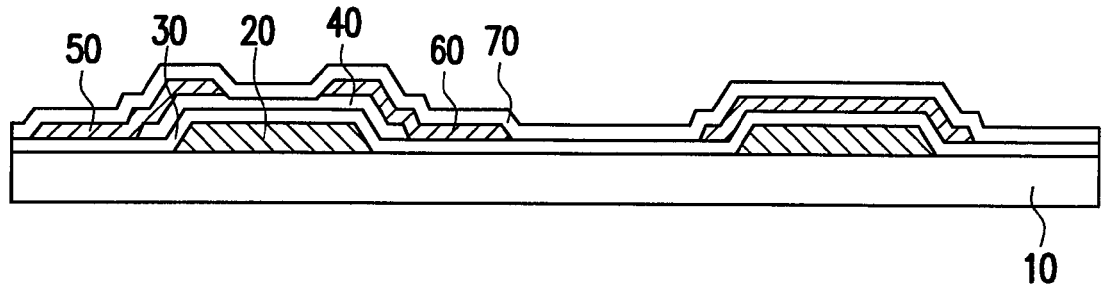
Figure 1F:
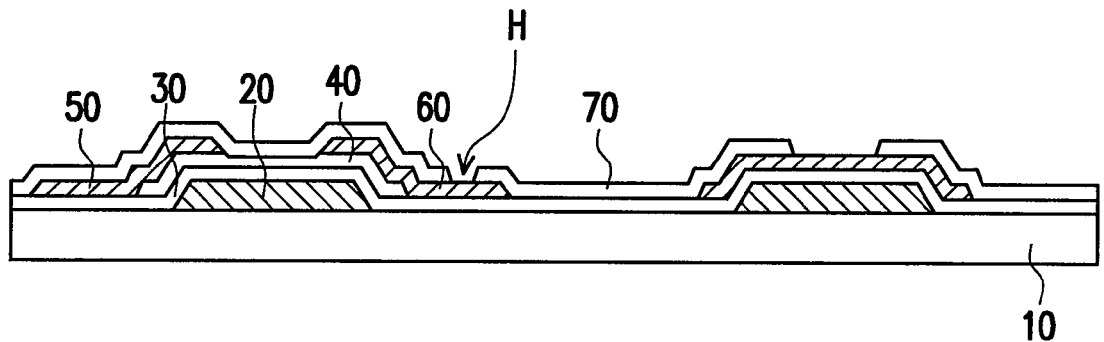
Figure 1G:
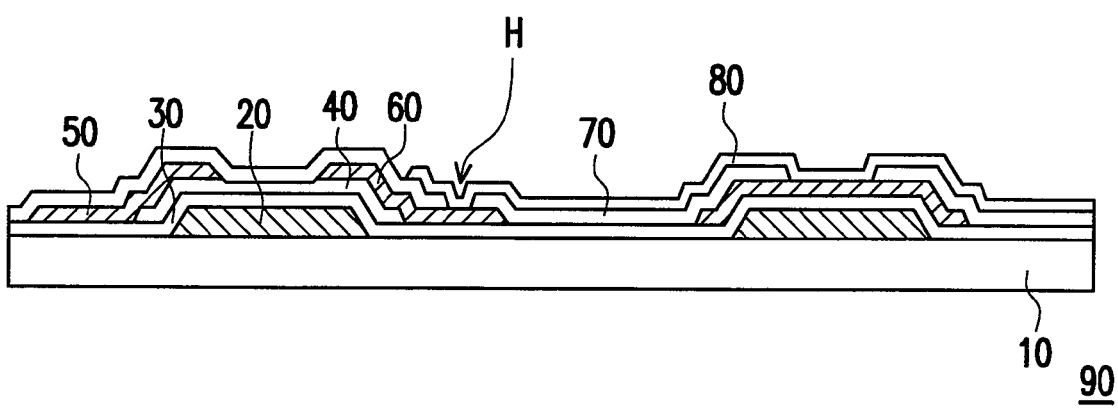
Figure 2A:
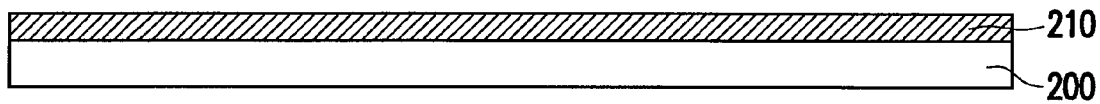
FIGS. 2A-2H are diagrams showing a method for fabrication a pixel structure, according to the present invention.

FIGS. 2A-2H are diagrams of a method for fabricating a pixel structure, according to the present invention. First, as shown in FIG. 2A, a substrate 200 is provided. The substrate 200 may be made of, for example, glass or plastic etc., a hard material or a soft material. Next, a first conductive layer 210 is formed on the substrate 200, wherein the first conductive layer 210 may be formed by using, for example, sputtering, evaporation or other thin film deposition process. A material of the first conductive layer 210 includes, for example, Cu, Al, Mo, Ti, Nd, or nitrides of the above-mentioned metals including MoN or TiN, for example, or the stacked layers of the above-mentioned metals and nitrides, or alloys of the above-mentioned metals or other conductive material.

Figure 2B:
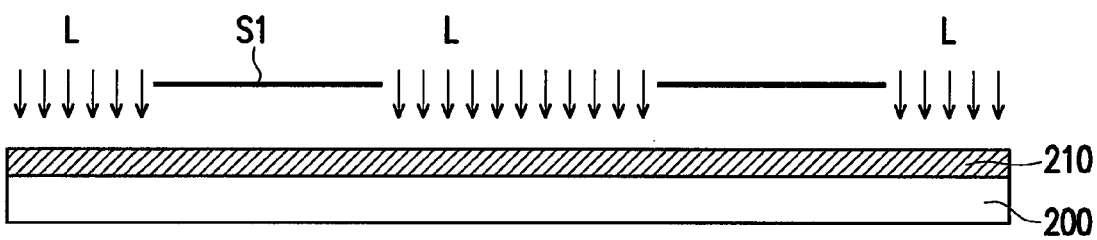

Next, as shown in FIG. 2B, a first shadow mask S1 is disposed over the first conductive layer 210, wherein the first shadow mask S1 exposes a portion of the first conductive layer 210. Laser L is applied through the first shadow mask S1 to irradiate the first conductive layer 210. In more detail, after the irradiation of the laser L, the first conductive layer 210 would absorb the energy of the laser L and be ablated from the surface of the substrate 200. The dose of the laser L used for ablating the first conductive layer 210 ranges from 10 mJ/cm$^2$ to 500 mJ/cm$^2$. Besides, the wavelength of the laser L is, for example, within a range between 100 nm and 400 nm. In particular, the laser L of the present embodiment can be used to perform an ablation process on the first conductive layer 210 in digital exposing mode, which functions to automatically position and adjust the energy so as to make the laser beam ablation process more accurate.

Figure 2C:
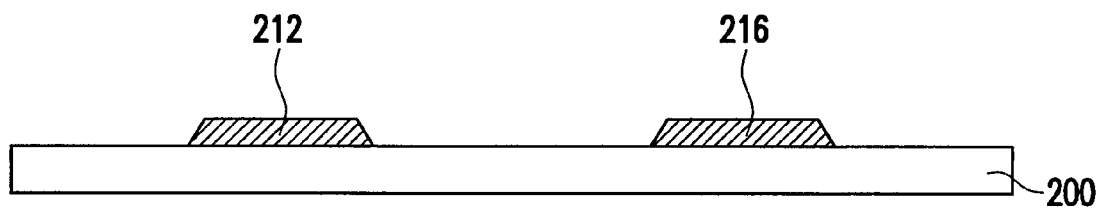

Next, as shown in FIG. 2C, after removing the part exposed by the first shadow mask S1 of the first conductive layer 210, the remained first conductive layer 210 constitutes a gate 212. Compared to the prior art where expensive photo-mask is used to fabricate the gate 212, the present invention uses an inexpensive shadow mask S1 to fabricate the gate 212, therefore, the overall production cost can be reduced. In an embodiment, the fabrication method further includes forming a lower-layer capacitor electrode 216 at the same time of forming the gate 212.

Figure 2D:
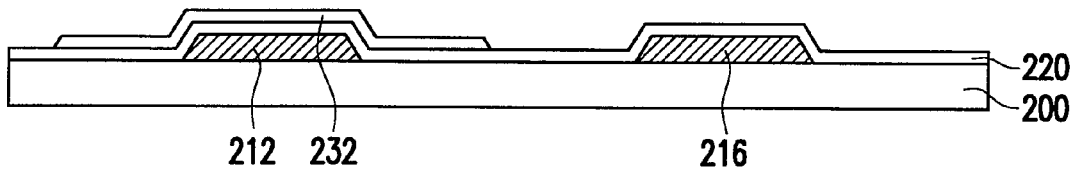

Next, as shown in FIG. 2D, a gate dielectric layer 220 is formed on the substrate 200 to cover the gate 212 and the lower-layer capacitor electrode 216, wherein the gate dielectric layer 220 is formed by using, for example, chemical vapor deposition (CVD) or other appropriate thin film deposition processes. A material of the gate dielectric layer 220 includes a dielectric material, for example, silicon oxide (SiO), silicon nitride (SiN) or silicon nitride oxide (SiNO) etc. Next, a channel layer 232 is formed on the gate dielectric layer 220. A material of the channel layer 232 includes, for example, amorphous silicon (a-Si) or other semiconductor materials. In an embodiment, a method of forming the channel layer 232 includes, for example, forming a semiconductor layer 230 (shown in FIG. 3A) by using a CVD process and patterning the semiconductor layer 230 to form the channel layer 232.

Figure 2E:
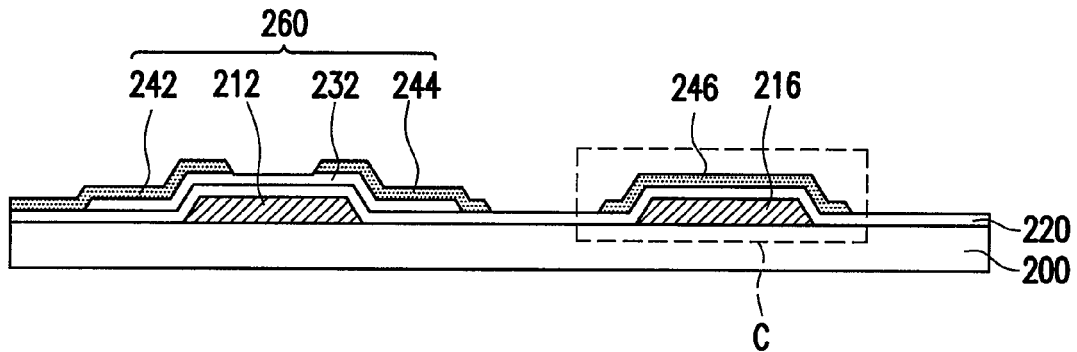

Next, as shown in FIG. 2E, a source 242 and a drain 244 are formed on the channel layer 232 above both sides of the gate 212, wherein a method of forming the source 242 and the drain 244 includes: forming a second conductive layer 240 (shown in FIG. 4A) on the channel layer 232 and the gate dielectric layer 220, and patterning the second conductive layer 240. A material of the second conductive layer 240 includes, for example, Cu, Al, Mo, Ti, Nd, or the nitrides of the above-mentioned metals, for example, MoN or TiN, or the stacked layers of the above-mentioned metals and nitrides, or the alloys of the above-mentioned metals, or other conductive materials. The above-mentioned gate 212, channel layer 232, source 242 and drain 244 together constitute a TFT 260. In addition, as shown in FIG. 2E, in the present embodiment, the method further includes forming an upper-layer capacitor electrode 246 at the time of forming the source 242 and the drain 244, so that the lower-layer capacitor electrode 216 and the upper-layer capacitor electrode 246 together serve as electrodes of a storage capacitor C to maintain a good display quality.

Figure 3A:
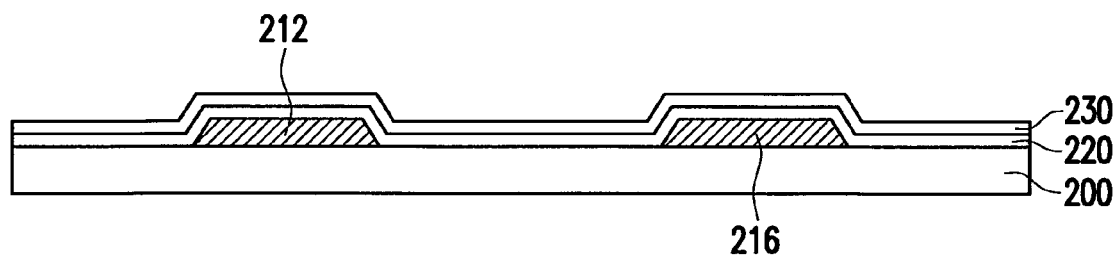
FIGS. 3A-3C are diagrams showing a laser ablation process to form a channel layer.

In other embodiments, the method further includes forming an ohmic contact layer (not shown) on the surface of the semiconductor layer 230 (as shown in FIG. 3A), and performing an etching process to remove a portion of the ohmic contact layer. For example, an ion implant process is performed on the surface of the semiconductor layer 230 (as shown in FIG. 3A) to form an N-type doping region to reduce the contact resistance between the channel layer 232 and the source and between the channel layer 232 and the drain 244.

Figure 2F:
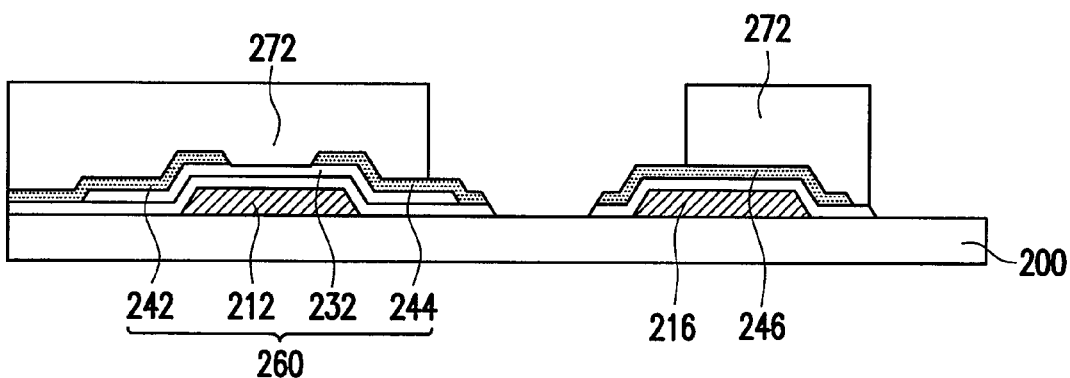

Next, as shown in FIG. 2F, a patterned passivation layer 272 is formed on the TFT 260 to cover the channel layer 232 and expose a portion of the drain 244. In the present embodiment, as shown in FIG. 2F, the patterned passivation layer 272 is formed on a region including a portion of the gate dielectric layer 220. A material of the patterned passivation layer 272 includes, for example, an organic dielectric material such as acrylic resin or photosensitive resin, or an inorganic dielectric material, for example, silicon oxide (SiO), silicon nitride (SiN) or silicon nitride oxide (SiNO) etc. A method of forming the patterned passivation layer 272 includes, for example, photoresist coating process or other appropriate thin film deposition process such as CVD. Next, referring to FIG. 2F, an etching process is performed using the patterned passivation layer 272 and the second conductive layer 240 as a mask to remove another portion of the gate dielectric layer 220, and to also expose the gate contact pad (not shown), wherein the portion removed is not covered by the patterned passivation layer 272 and the second conductive layer 240.

Figure 2G:
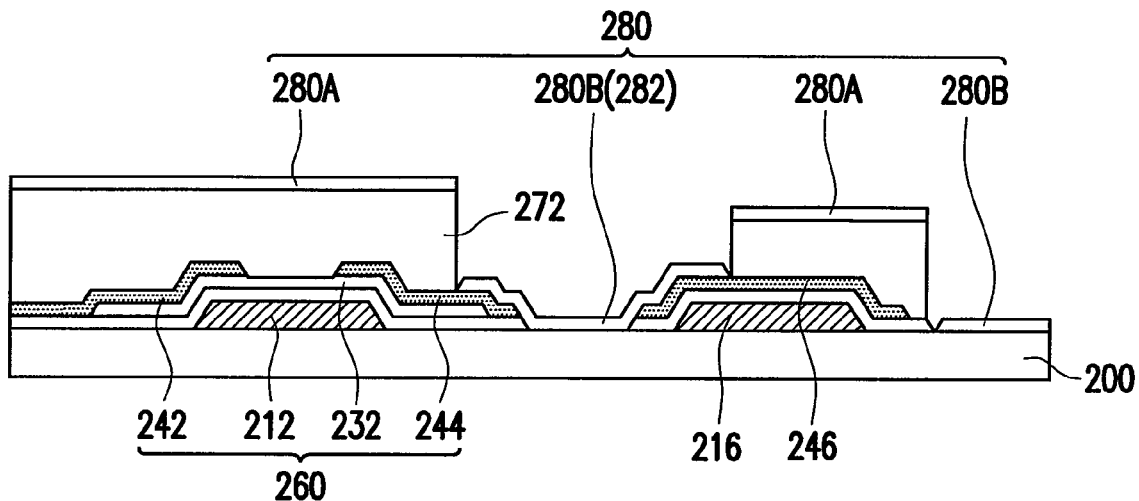
Figure 2H:
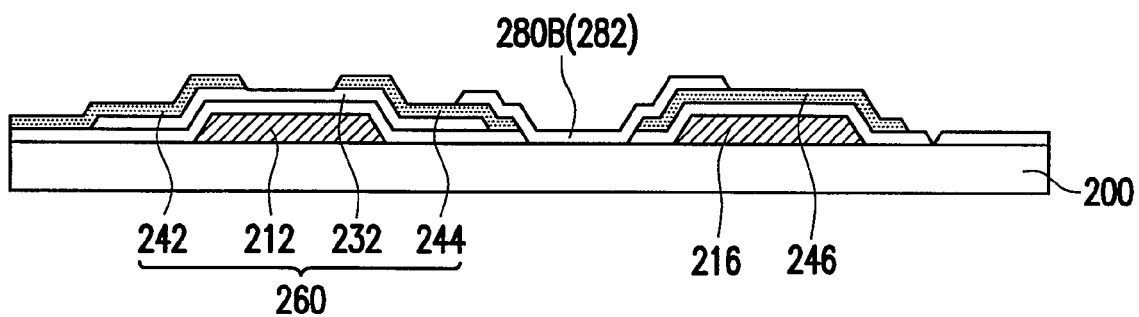

Referring to FIG. 2G, an electrode material layer 280 is formed to cover the patterned passivation layer 272 and the exposed a portion of the drain, wherein the electrode material layer 280 includes an ITO layer, an IZO layer or high transparent material, and a method of forming the electrode material layer 280 includes, for example, using sputtering process to form an ITI layer or an IZO layer. Since the patterned passivation layer 272 is underneath the electrode material layer 280 and may be considered as the bottom layer of the electrode material layer 280, wherein the patterned passivation layer 272 has an appropriate thickness, thus, two partial electrode material layers 280A and 280B electrically insulated from each other would be automatically formed while forming the electrode material layer 280. In more detail, the thickness of the patterned passivation layer 272 underneath the electrode material layer 280 may be properly controlled by design, where the anisotropic characteristics of thin film deposition process for forming the electrode material layer 280 is utilized, so that the two inconsecutive conductive layers 280A and 280B are formed in the conductive layer 280 in correspondence to the thickness variation of the bottom layer, the patterned passivation layer 272. A partial electrode material layer 280A is formed on the patterned passivation layer 272 and another partial electrode material layer 280B is formed on the substrate 200 and the drain 244, wherein a portion of the partial electrode material layer 280B connected to the drain 244 constitute a pixel electrode 282. Note that, compared to the prior art, the embodiment takes advantage of the design of the patterned passivation layer 272 to simultaneously form and pattern the electrode material layer 280 to complete the pixel electrode 282. Therefore, it is possible to reduce the number of photolithography and etching processes and simplify the whole process. In general, after forming the pixel electrode 282, the patterned passivation layer 272 may be removed as shown in FIG. 2H. The method of removing the patterned passivation layer 272 includes, for example, using stripper to treat the patterned passivation layer 272 so that the bottom surface of the patterned passivation layer 272 is ablated from the surface of the TFT 260 or the surface of the gate dielectric layer 220 because the stripper permeates into the bottom surface of the passivation layer 272.

Figure 3B:
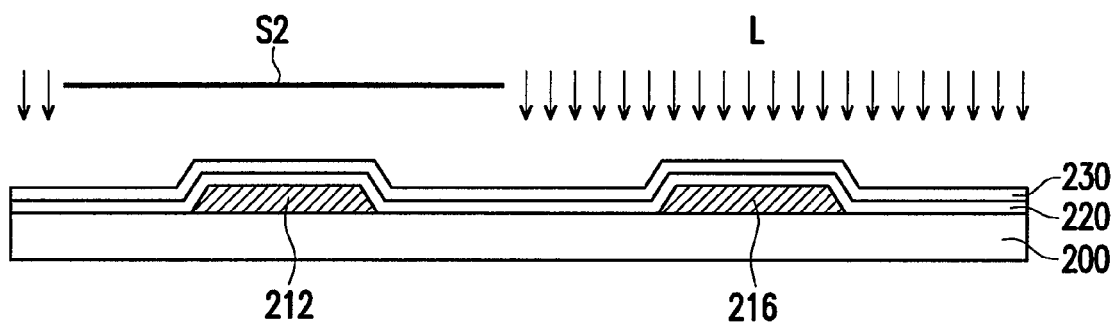
Figure 3C:
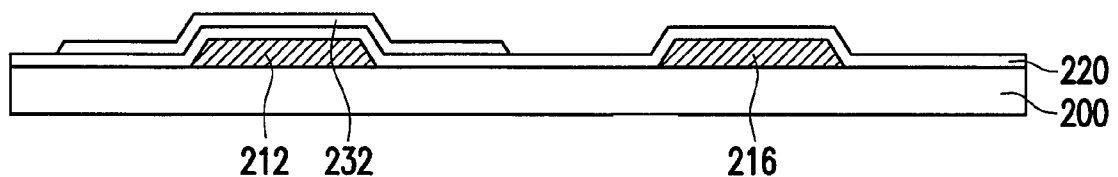

In addition, the above-described method of forming the channel layer 232 may include, for example, using a laser ablation process. FIGS. 3A-3C are diagrams showing a laser ablation process to form a channel layer. First, as shown in FIG. 3A, a semiconductor layer 230 is formed on a substrate 200. Next, as shown in FIG. 3B, a second shadow mask S2 is provided and placed over the semiconductor layer 230, wherein the second shadow mask S2 exposes a portion of the semiconductor layer 230. Next, laser L is applied through the second shadow mask S2 to irradiate the semiconductor layer 230 to remove the part exposed by the second shadow mask S2 of the semiconductor layer 230. Next, as shown in FIG. 3C, the remainder semiconductor layer 230 constitutes a channel layer 232. Specifically, the laser L adopts digital exposing mode for conducting the ablation procedure on the semiconductor layer 230, wherein the digital exposing mode functions to automatically position and adjust the energy so as to make the laser beam ablation process more accurate.

Figure 4A:
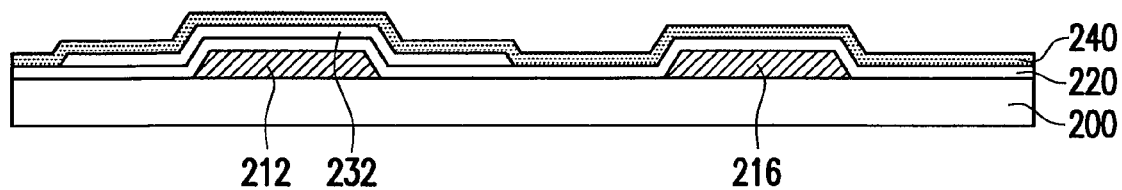
FIGS. 4A-4C are diagrams showing a fabrication method to form a source and a drain.
Figure 4B:
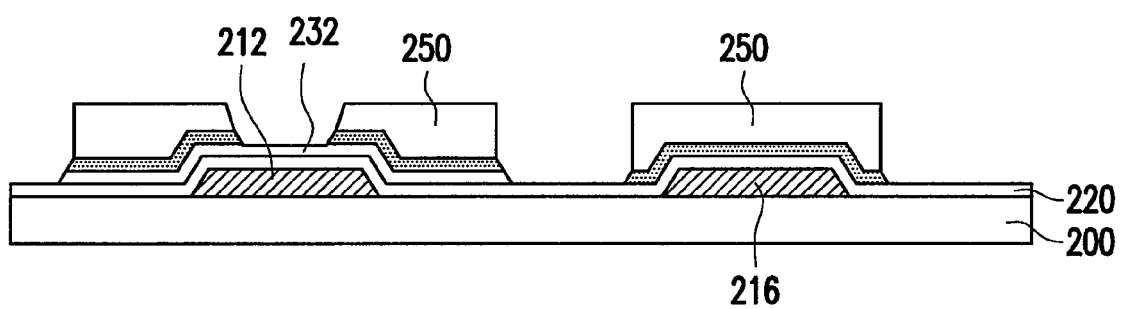
Figure 4C:
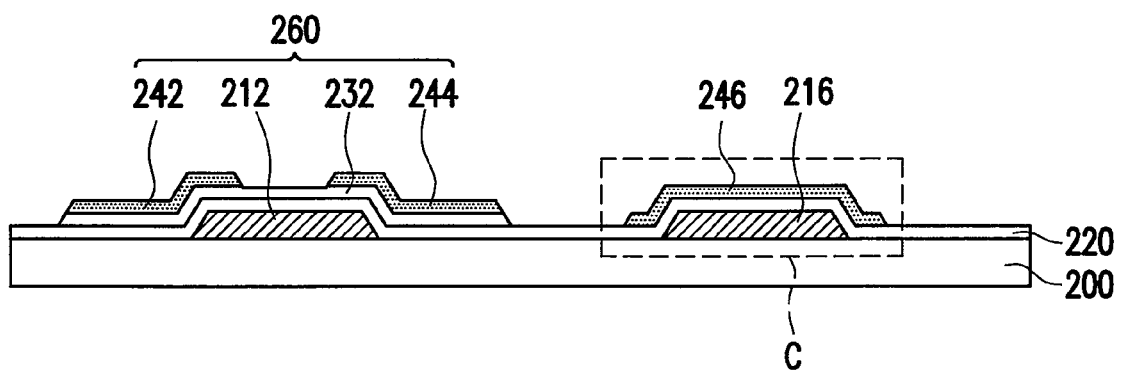

FIGS. 4A-4C are diagrams showing a fabrication method to form a source 242 and a drain 244. First, as shown in FIG. 4A, a second conductive layer 240 is formed on the channel layer 232 and the gate dielectric layer 220. Next, as shown in FIG. 4B, the second conductive layer 240 is patterned. In more detail, for example, a photoresist layer 250 is formed on the channel layer 232 above both sides of the gate 212, and performing an etching process so as using the photoresist layer 250 as a mask to remove a portion of the second conductive layer 240 not covered by the photoresist layer 250. Next, as shown in FIG. 4C, after removing the photoresist layer 250, a source 242 and a drain 244 are respectively formed on the channel layer 232 at both sides of the gate 212. In the embodiment, a method of forming the photoresist layer 250 further includes forming the photoresist layer 250 on the gate dielectric layer 220 over the lower-layer capacitor electrode 216, so that after the etching process, an upper-layer capacitor electrode 246 is formed, and the upper-layer capacitor electrode 246 and the lower-layer capacitor electrode 216 together constitute a storage capacitor C. The material of second conductive layer 240 includes, for example, Cu, Al, Mo, Ti, Nd, or nitrides of the above-mentioned metals, MoN or TiN, or the stacked layers of the above-mentioned metals and nitrides, or the alloys of the above-mentioned metals, or other conductive materials. In an embodiment, the etching process includes, for example, a wet etching process. In other embodiments, the etching process may be a dry etching process as well. Besides, the process of removing the photoresist layer 250 includes, for example, a wet etching process.

Figure 5A:
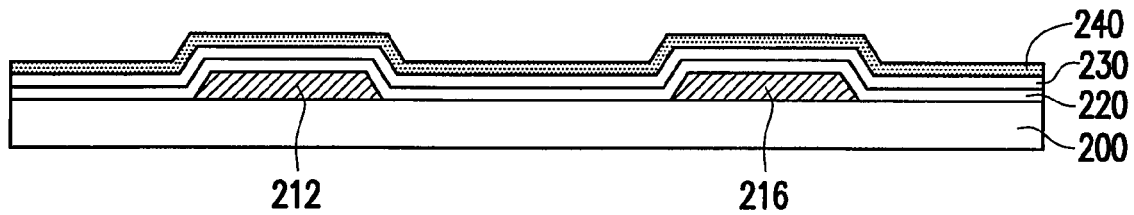
FIGS. 5A-5D are diagrams showing a fabrication method to simultaneously form a channel layer, a source and a drain.
Figure 5B:
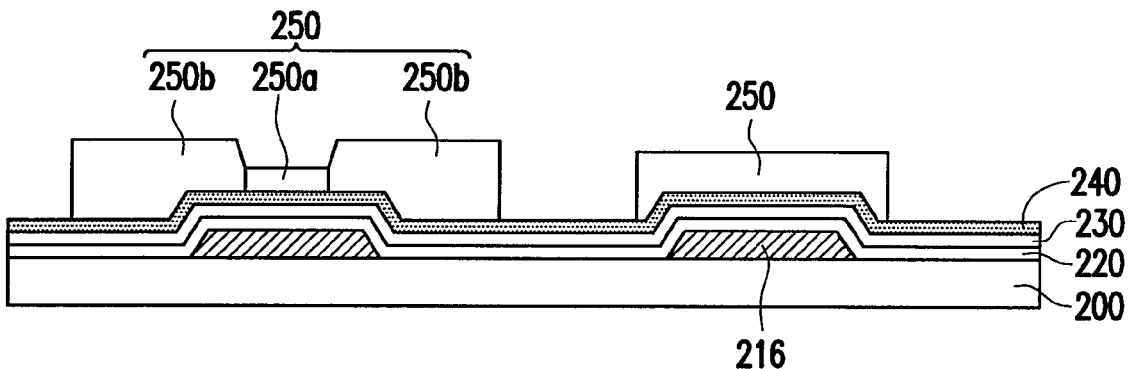
Figure 5C:
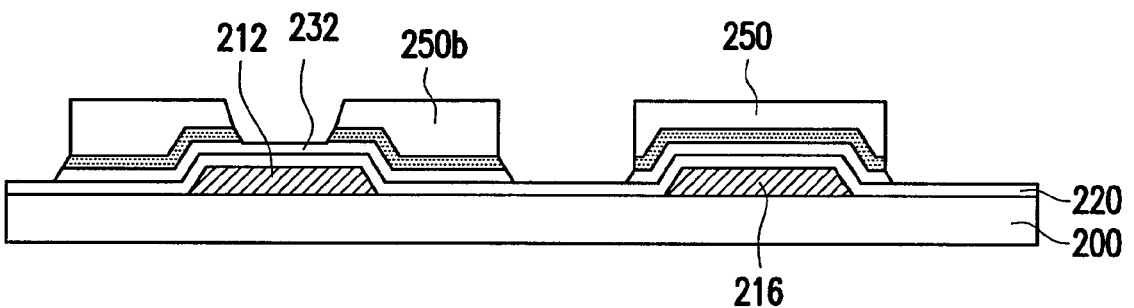
Figure 5D:
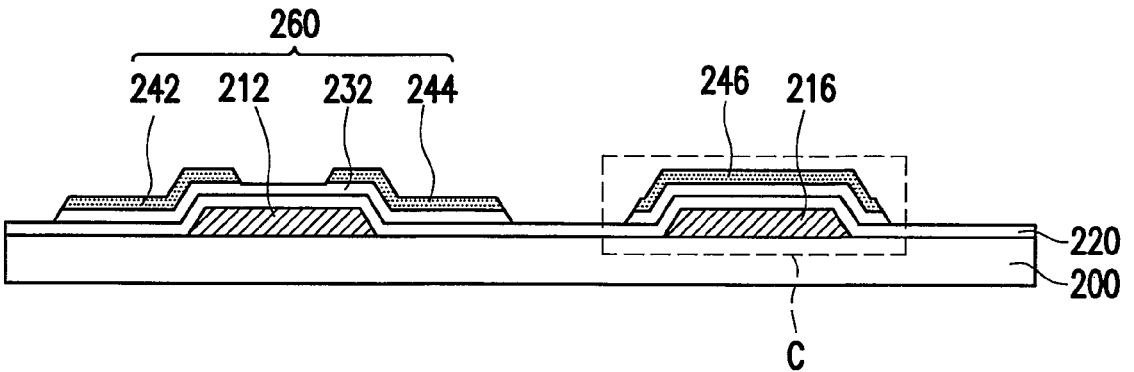

In another embodiment, as an alternative, the channel layer 232, the source 242 and the drain 244 may be simultaneously formed. For example, FIGS. 5A-5D are diagrams showing a fabrication method to simultaneously form a channel layer, a source and a drain. As shown in FIG. 5A, after forming the gate dielectric layer 220, a semiconductor layer 230 and a second conductive layer 240 are sequentially formed on the gate dielectric layer 220. Next, as shown in FIG. 5B, a photoresist layer 250 is formed on the second conductive layer 240 over the gate 212. The photoresist layer 250 over the gate 212 is divided into a first photoresist block 250a and a second photoresist block 250b located at both sides of the first photoresist block 250a, and the thickness of the first photoresist block 250a is less than the thickness of the second photoresist block 250b as shown in FIG. 5B. In the embodiment, the method of forming the first photoresist block 250a and the second photoresist block 250b of the photoresist layer 250 includes a halftone mask process or a graytone mask process. In other embodiments, the method of forming the first photoresist block 250a and the second photoresist block 250b of the photoresist layer 250 may include, for example, applying a laser through a shadow mask (not shown) to irradiate the photoresist layer 250. Next, as shown in FIG. 5B, a first etching process is performed on the second conductive layer 240 using the photoresist layer 250 as a mask. Next, as shown in FIG. 5C, the photoresist layer 250 is thinned until the first photoresist block 250a is completely removed, wherein the method of reducing the photoresist layer 250 includes, for example, an ashing process. Next, after the first photoresist block 250a is completely removed, a second etching process is performed on the semiconductor layer 230 and the second conductive layer 240 using the remained second photoresist block 250 as a mask. In the present embodiment, the first etching process includes, for example, a wet etching process. In other embodiments, the etching processes can be dry etching as well. Next, as shown in FIG. 5D, after the remained photoresist layer 250 is removed, the remained second conductive layer 240 constitutes a source 242 and a drain 244, and the semiconductor layer 230 constitutes a channel layer 232. In the present embodiment, the process of removing the photoresist layer 250 includes, for example, a wet etching process, and the method of forming the photoresist layer 250 includes forming the photoresist layer 250 over the lower-layer capacitor electrode 216.

Figure 6A:
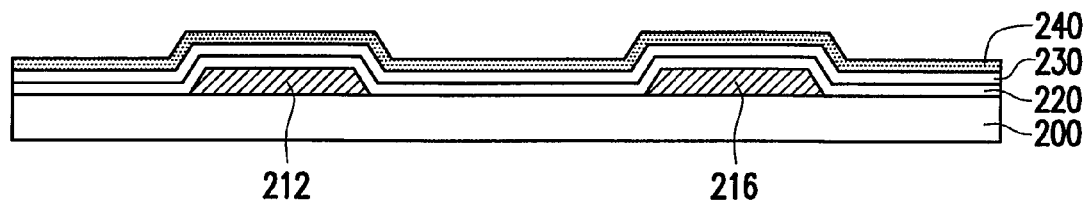
FIGS. 6A-6F are diagrams showing another fabrication method to simultaneously form a channel layer, a source and a drain.
Figure 6B:
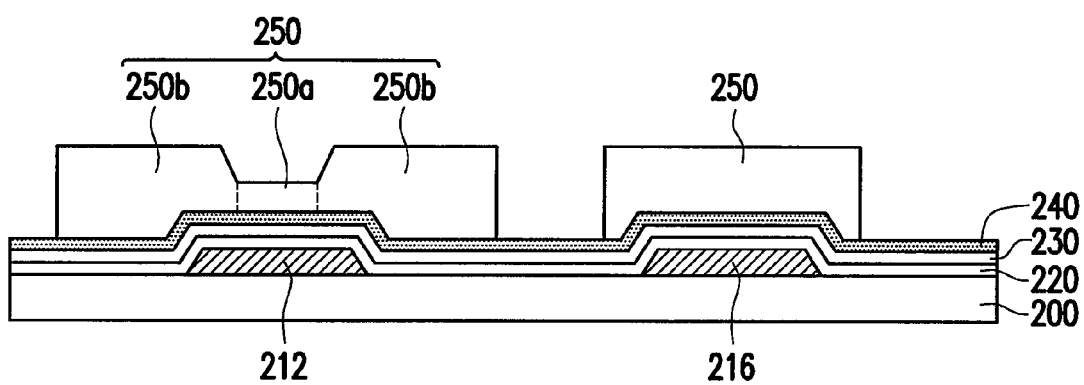
Figure 6C:
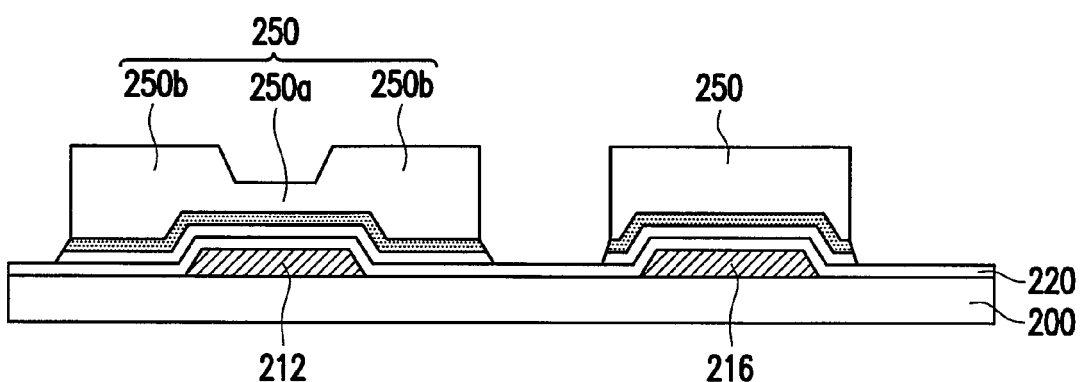
Figure 6D:
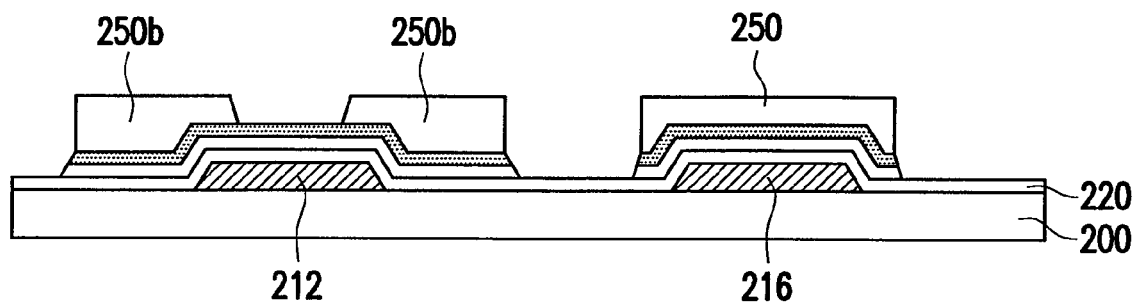
Figure 6E:
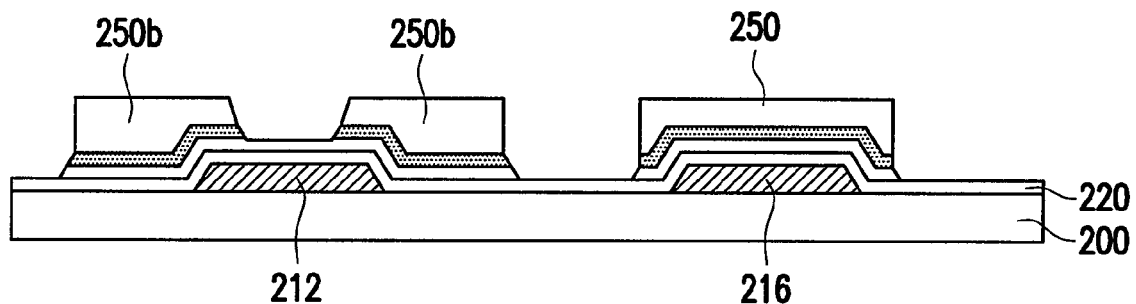
Figure 6F:
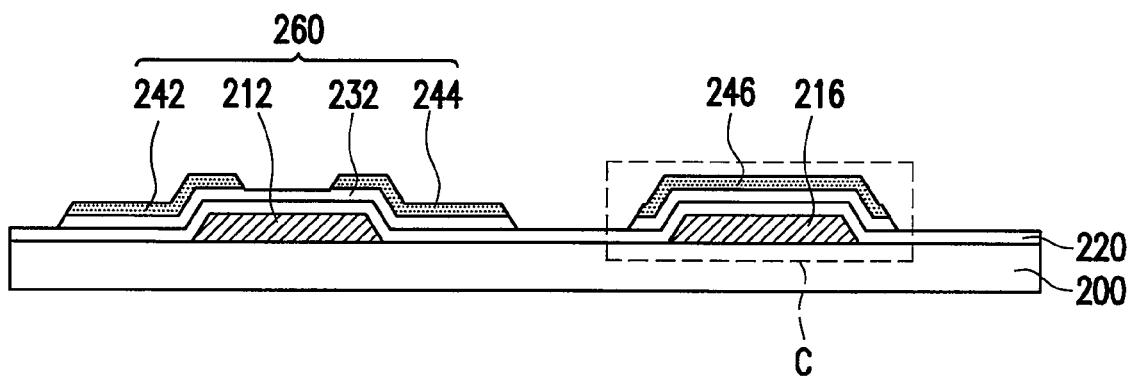

FIGS. 6A-6F are diagrams showing another fabrication method to simultaneously form a channel layer, a source and a drain. The channel layer 232, the source and the drain 244 may be simultaneously formed. As shown in FIG. 6A, after forming the gate dielectric layer 220, a semiconductor layer 230 and a second conductive layer 240 are sequentially formed on the gate dielectric layer 220. Next, as shown in FIG. 6B, the photoresist layer 250 over the gate 212 may be divided into a first photoresist block 250a and a second photoresist block 250b at both sides of the first photoresist block 250a, and the thickness of the first photoresist block 250a is less than the thickness of the second photoresist block 250. In the present embodiment, the method of forming the first photoresist block 250a and the second photoresist block 250b of the photoresist layer 250 includes, for example, a halftone mask process or a graytone mask process. In other embodiments, the step of forming the first photoresist block 250a and the second photoresist block 250b of the photoresist layer 250 may also include, for example, applying a laser through a shadow mask (not shown) to irradiate the photoresist layer 250. Next, as shown in FIG. 6C, a first etching process is conducted on the second conductive layer 240 by using the photoresist layer 250 as a mask, and conducting a second etching process on the semiconductor layer 230 by using the photoresist layer 250 as the mask. Next, as shown in FIG. 6D, the thickness of the photoresist layer 250 is reduced until the first photoresist block 250a is completely removed, wherein the process of reducing the thickness of the photoresist layer 250 includes, for example, an ashing process. Next, as shown in FIG. 6E, a third etching process on the second conductive layer 240 is performed using the remained second photoresist block 250b as a mask, and a fourth etching process is performed on the semiconductor layer 230 using the remained photoresist block 250b as a mask. Next, as shown in FIG. 6F, after performing the process to remove the remained photoresist layer 250, the residue second conductive layer 240 constitutes the source 242 and the drain 244, and the semiconductor layer 230 constitutes the channel layer 232. Note that in the above-described step of simultaneously fabricating the channel layer, the source and the drain may be fabricated by using two etching processes or four etching processes. In other embodiments, a method of simultaneously fabricating the channel layer, the source and the drain may be fabricated by using a single etching process. The present invention does not restrict the number of etching processes for simultaneously fabricating the channel layer, the source and the drain.

Figure 7A:
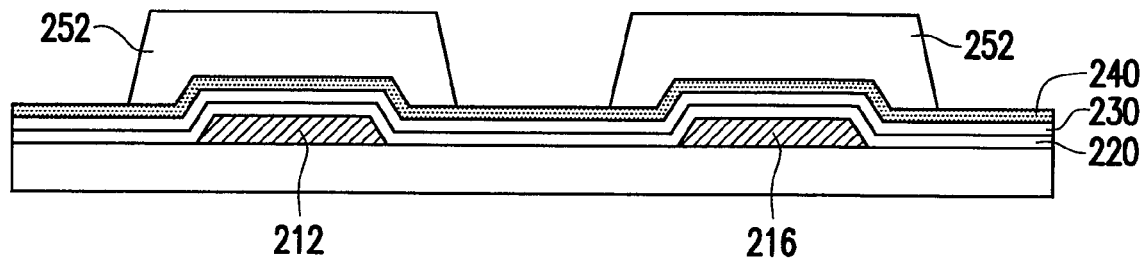
FIGS. 7A-7E are diagrams showing yet another fabrication method to simultaneously form a channel layer, a source and a drain.
Figure 7B:
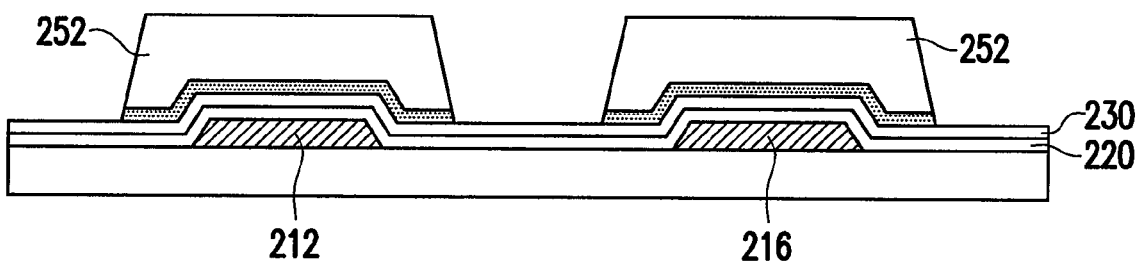

FIGS. 7A-7E are diagrams showing yet another fabrication method to simultaneously form a channel layer 232, a source 242 and a drain 244. First, as shown in FIG. 7A, after forming the gate dielectric layer 220, a semiconductor layer 230 and a second conductive layer 240 are sequentially formed on the gate dielectric layer 220, and a patterned passivation layer 252 is formed on the second conductive layer 240 over the gate 212. Next, as shown in FIG. 7B, the patterned photoresist layer 252 is used as a mask to remove the second conductive layer 240 exposed by the patterned photoresist layer 252, wherein the process of removing the second conductive layer 240 includes, for example, a wet etching process. The semiconductor layer 230 may be comprised of an amorphous silicon (a-Si), polysilicon, microcrystal silicon, monocrystal silicon or a combination of the above-mentioned materials. In other embodiments, an ohmic contact layer (not shown) is formed on the surface of the semiconductor layer 230 first, wherein the material and the fabrication object of the ohmic contact layer are described hereinbefore, and they are omitted for simplicity.

Figure 7C:
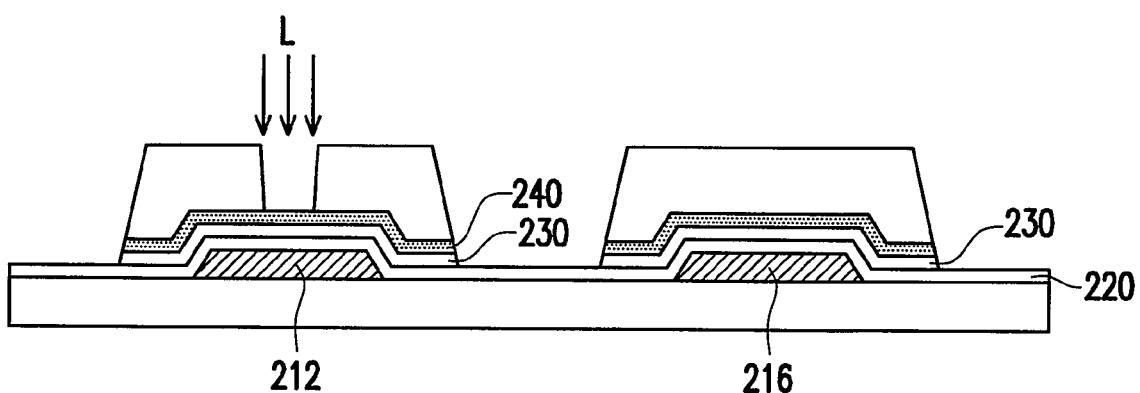
Figure 7D:
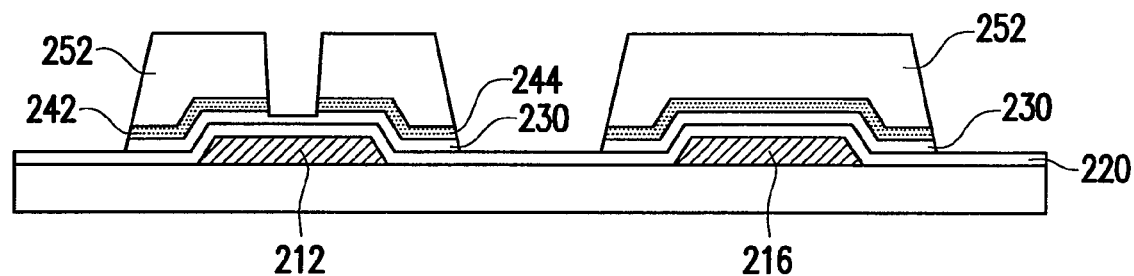
Figure 7E:
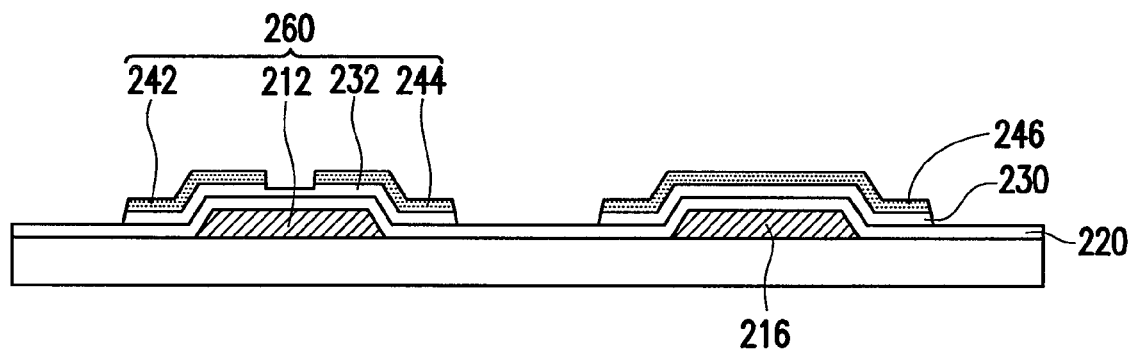
Figure 8A:
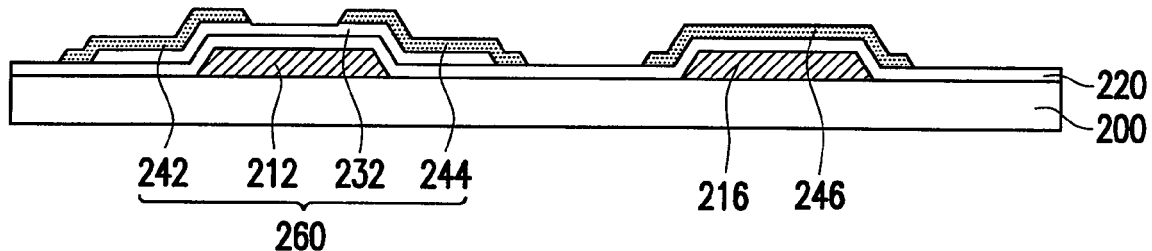
FIGS. 8A-8C are diagrams showing a laser ablation process to form a patterned passivation layer.
Figure 8B:
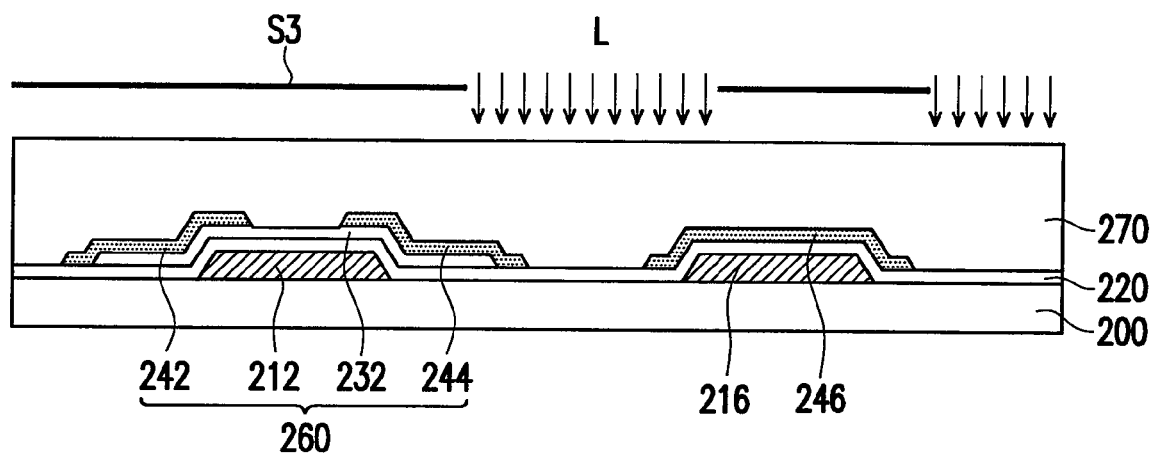
Figure 8C:
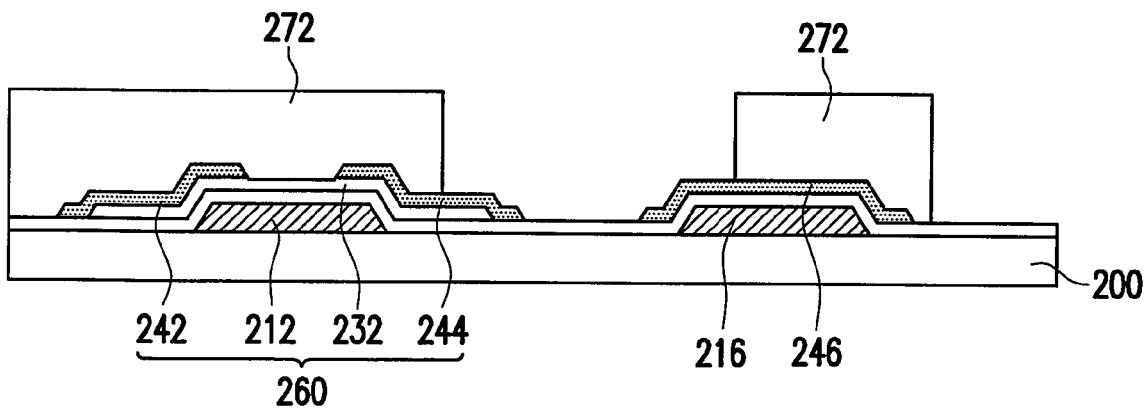

Still referring to FIG. 7C, a portion of the patterned photoresist layer 252 is removed by using laser L so as to make the patterned photoresist layer 252 expose a portion of the second conductive layer 240. Particularly, the laser L in the embodiment takes digital exposing mode for conducting the ablation procedure on the patterned photoresist layer 252, wherein the digital exposing mode functions to automatically position and adjust the energy so as to make the laser beam ablation process more accurate. Next, the patterned photoresist layer 252 and the second conductive layer 240 are used as a mask to remove a portion of the semiconductor layer 230, wherein the process of removing the semiconductor layer 230 includes using an isotrope process or a nonisotrope process. Note that as shown in FIG. 7C, during a method of removing the semiconductor layer 230, the second conductive layer 240 may serve as a passivation layer so as to avoid the semiconductor layer 230 over the gate 212 from being removed, and accordingly, the above method may be performed prior to ablating the partial patterned photoresist layer 252 by using the laser L. Next, referring to FIG. 7D, the patterned photoresist layer 252 is used as a mask to remove the second conductive layer 240 exposed by the patterned photoresist layer 252, so that the second conductive layer 240 over the gate 212 constitutes the source 242 and the drain 244, and the semiconductor layer 230 over the gate 212 constitutes the channel layer 232. Next, as shown in FIG. 7E, after removing the patterned photoresist layer 252, the gate 212, the channel layer 232, the source 242 and the drain together constitute a thin film transistor (TFT) 260. In the embodiment, the patterned photoresist layer 252 includes disposing the patterned photoresist layer 252 over the lower-layer capacitor electrode 216, so that during the formation of the source 242 and the drain 244, the upper-layer capacitor electrode 246 is simultaneously formed. Note that compared to the prior art, the laser L in the embodiment is used to define the pattern of the patterned photoresist layer 252 and further to simultaneously form the channel layer 232, the source 242 and the drain 244, which contributes to reduce one of the photolithography and etching processes and reduces the cost of the photolithography and etching. In addition, the above-described process of forming the patterned passivation layer 272 can be performed, for example, after forming the TFT 260 to form a passivation layer 270 on the gate dielectric layer 220 and the TFT 260, and patterning the passivation layer 270. In another embodiment, the process of forming the patterned passivation layer 272 may be, for example, a laser ablation process to fabricate the patterned passivation layer 272. FIGS. 8A-8C are diagrams showing a laser ablation process to form a patterned passivation layer. First, as shown in FIG. 8A, the TFT 260 is formed. Next, as shown in FIG. 8B, a passivation layer 270 is formed on the gate dielectric layer 220 and the TFT 260, and a third shadow mask S3 is disposed over the passivation layer 270, and the third shadow mask S3 exposes a portion of the passivation layer 270, and a laser L is applied through the third shadow mask S3 to irradiate the passivation layer 270 to remove the part exposed by the third shadow mask S3 of the passivation layer 270. Next, as shown in FIG. 8C, a patterned passivation layer 272 is formed. FIG. 8C is a diagram corresponding to a case where the etching process on the gate dielectric layer 220 has not been conducted yet. In particular, the laser L of the present embodiment can be used to perform an ablation process on the first conductive layer 210 in digital exposing mode, which functions to automatically position and adjust the energy so as to make the laser beam ablation process more accurate.

The Second Embodiment

FIGS. 9A-9I are diagrams showing another fabrication method of a pixel structure according to the second embodiment of the present invention, wherein the method of forming the channel layer 232 can be, for example, the same as that described with reference to FIGS. 3A-3C. Besides, the method of forming the source 242 and the drain 244 can be the same as that described with reference to FIGS. 4A-4C or FIGS. 5A-5D, or FIGS. 7A-7E. Since the method of FIGS. 9A-9F are similar to that of FIGS. 2A-2F in the first embodiment, the method of FIGS. 9A-9F are omitted to describe.

Figure 9A:
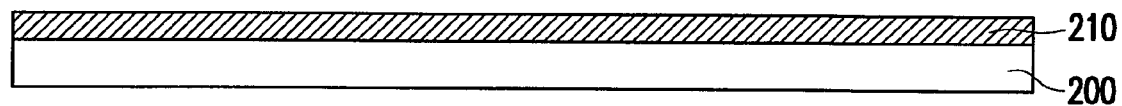
FIGS. 9A-9I are diagrams showing another method for fabricating a pixel structure, according to the present invention.
Figure 9B:
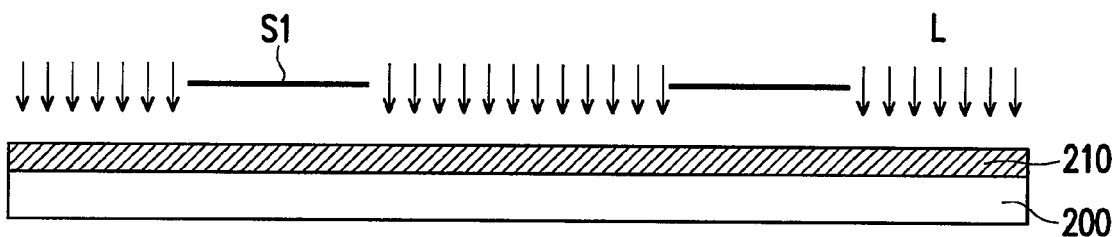
Figure 9C:
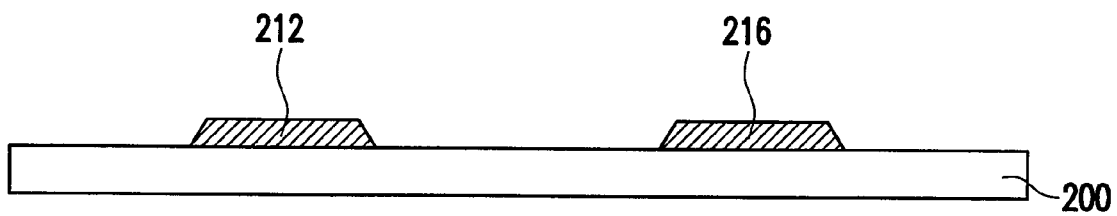
Figure 9D:
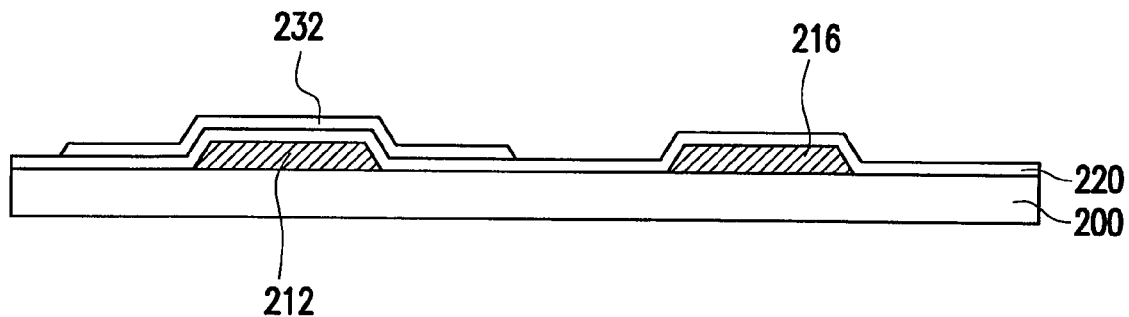
Figure 9E:
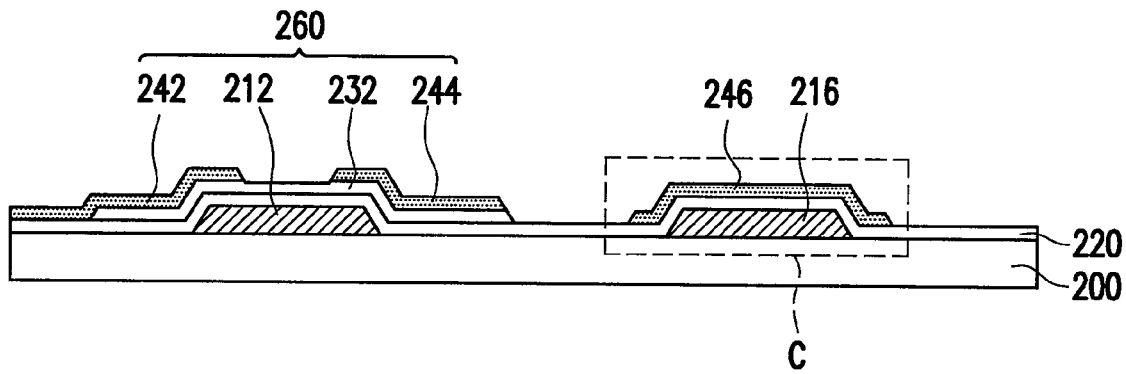
Figure 9F:
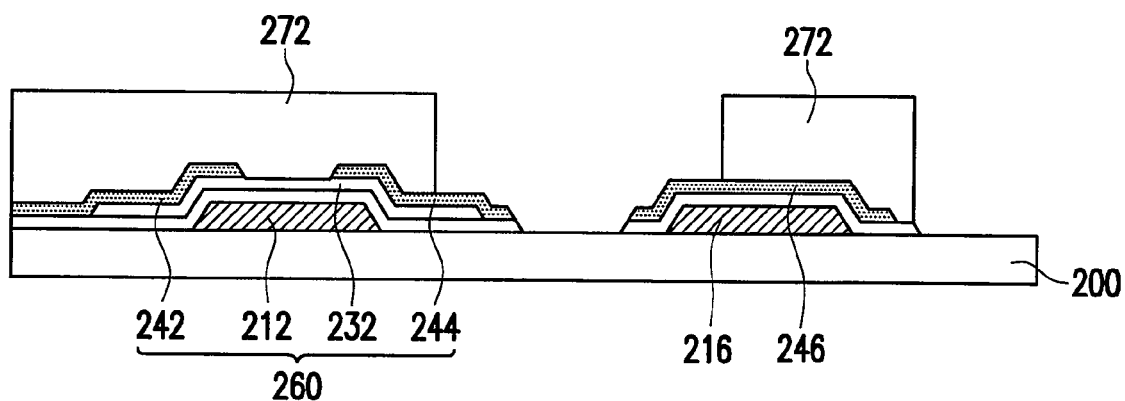
Figure 9G:
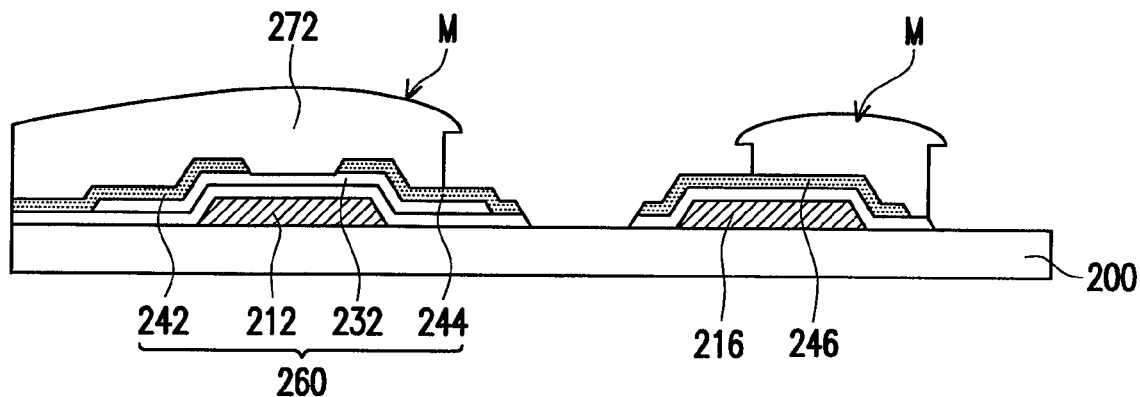

Referring to FIG. 9G, after forming the patterned passivation layer 272, the patterned passivation layer 272 is baked so that the top-surface of the patterned passivation layer 272 transformed into a protruded shape, in other words, the top-surface of the patterned passivation layer is protruded out of the sidewall of the patterned passivation layer after baking process. In the embodiment, the top-surface of the patterned passivation layer 272 is substantially a mushroom-like shape M. Note that in particular, various parameters of the baking process must be taken into consideration, such as oven temperature, heating rate and heating time of the baking process in order to vary the shape of the patterned passivation layer 272, but generally speaking, the top-surface thereof roughly has a mushroom-like shape. In fact, the present invention does not limit the shape of the top-surface of the patterned passivation layer 272.

Figure 9H:
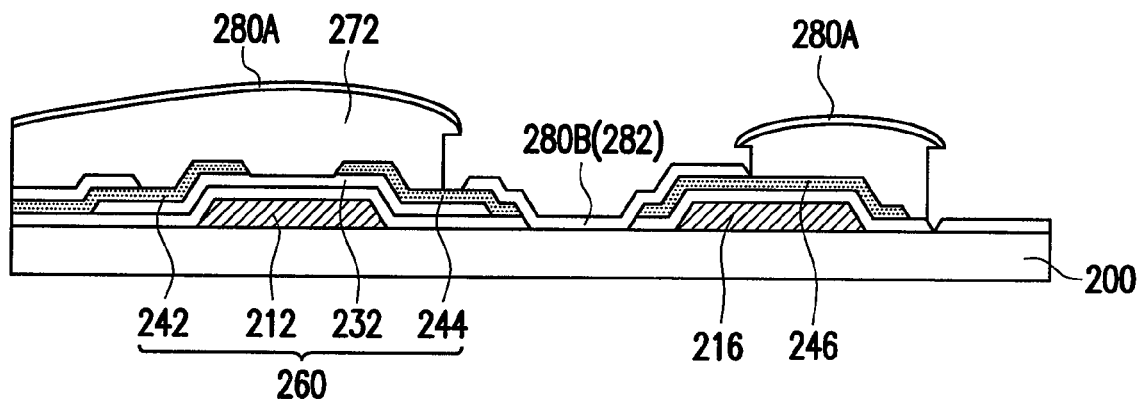

Next, as shown in FIG. 9H, an electrode material layer 280 is formed to cover the patterned passivation layer 272 and the exposed drain 244, wherein the process of forming the electrode material layer 280 includes, for example, a sputtering process to form an ITO layer, an IZO layer or high transparent material. Considering the top-surface M of the patterned passivation layer 272 has a mushroom shape, therefore, two partial electrode material layers 280A and 280B electrically insulated from each other would be formed at the time of forming the electrode material layer 280, wherein a partial electrode material layer 280A is formed on the patterned passivation layer 272, and another partial electrode material layer 280B is formed on the substrate 200 and the drain 244. The partial electrode material layer 280B connected to the drain 244 constitutes the pixel electrode 282. Note that, compared to the prior art, the electrode material layer 280 is formed and patterned simultaneously by means of designing the pattern of the top-surface of the patterned passivation layer 272. In this way, the fabrication of the pixel electrode 282 is accomplished by saving one photolithography and etching process and simplifying the fabrication process.

Figure 9I:
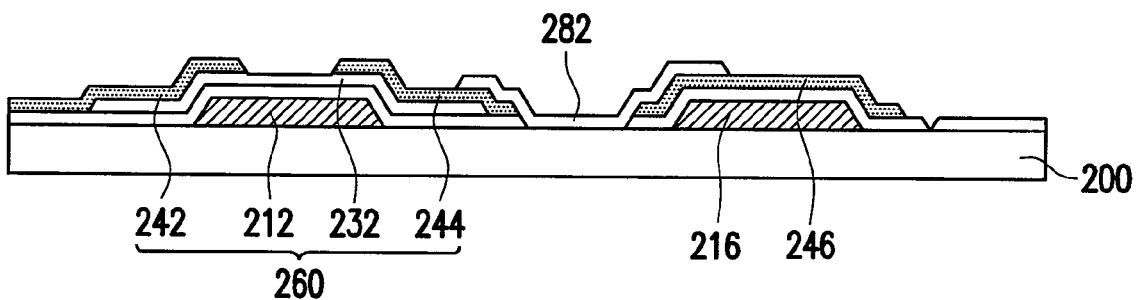

After forming the pixel electrode 282, the patterned passivation layer 272 is usually removed, as shown in FIG. 9I. The process of removing the patterned passivation layer 272 includes, for example, applying stripping liquid onto the surfaces of the patterned passivation layer 272 and the electrode material layer 280, so that the bottom surface of the patterned passivation layer 272 is ablated from the surface of the TFT 260 or the surface of the gate dielectric layer 220 because the stripper permeates into the bottom surface of the passivation layer 272.

In summary one photolithography and etching process is saved in the method of fabricating the pixel electrode provided by the present invention. The present invention forming the pixel electrode by directly patterning the conductive layer via a proper profile of the patterned passivation layer. Therefore, the method is simplified. In addition, the present invention uses laser to irradiate the semiconductor layer instead of using a lithography etching process. The fabrication method of a pixel structure of the present invention has at least following advantages.

1. Compared to the prior art, photolithography process is not required to fabricate the pixel electrode; thus, the fabrication cost may be effectively reduced.
2. Since the number of the process steps for fabricating a pixel structure is reduced, and an excessively prolong photolithography and etching process (including, for example, photoresist coating, soft baking, hard baking, exposing, developing, etching and photoresist removing) can be reduced, therefore the overall process may be simplified and the defects during fabricating a pixel structure may be reduced.
3. The process of removing the semiconductor layer by using a laser ablation process can further be applied to repair a pixel electrode, where the possible ITO residue, IZO residue or high transparent material residue in a pixel structure process can be removed, which contributes to solve short-circuit problem between the pixel electrodes and increase the production yield.
4. The present invention uses digital exposing mode, which can make the laser beam to automatically position and adjust the laser energy to suit the material and thickness of the film layer; therefore, production yield is further increased.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for fabricating a pixel structure, comprising:
providing a substrate;
forming a first conductive layer over the substrate;
providing a first shadow mask over the first conductive layer, wherein the first shadow mask exposes a portion of the first conductive layer;
applying a laser ablation process through the first shadow mask to irradiate the first conductive layer to remove the exposed portion of the first conductive layer and form a gate;
forming a gate dielectric layer over the substrate to cover the gate;
forming a channel layer on the gate dielectric layer above the gate;
forming a source and a drain on the channel layer above both sides of the gate, wherein the gate, the channel layer, the source and the drain together constitute a thin film transistor;
forming a patterned passivation layer over the thin film transistor to cover the channel layer and expose the drain; and
forming an electrode material layer to cover the patterned passivation layer and the exposed drain, wherein the patterned passivation layer is used to pattern the electrode material layer to form a pixel electrode.

2. The method for fabricating a pixel structure according to claim 1, further comprising baking the patterned passivation layer after forming the patterned passivation layer so as to make the top-surface of the patterned passivation layer is protruded out of the sidewall of the patterned passivation layer.

3. The method for fabricating a pixel structure according to claim 2, wherein a shape of top-surface of the patterned passivation layer comprises a mushroom-like shape.

4. The method for fabricating a pixel structure according to claim 1, further comprising removing the patterned passivation layer after forming the pixel electrode.

5. The method for fabricating a pixel structure according to claim 1, wherein a method of forming the channel layer comprises:
forming a semiconductor layer over the substrate; and
patterning the semiconductor layer to form the channel layer.

6. The method for fabricating a pixel structure according to claim 1, wherein a method of forming the channel layer comprises:
forming a semiconductor layer on the substrate;
providing a shadow mask over the semiconductor layer, wherein the shadow mask exposes a portion of the semiconductor layer; and
applying a laser through the second shadow mask to irradiate the semiconductor layer for removing the exposed portion of the semiconductor layer.

7. The method for fabricating a pixel structure according to claim 1, wherein a method of forming the source and the drain comprises:
forming a second conductive layer over the channel layer and the gate dielectric layer; and
patterning the second conductive layer to form the source and the drain.

8. The method for fabricating a pixel structure according to claim 1, wherein a method of forming the patterned passivation layer comprises:
   forming a passivation layer on the thin film transistor; and
   patterning the passivation layer.

9. The method for fabricating a pixel structure according to claim 1, wherein a method of forming the patterned passivation layer comprises:
   forming a passivation layer on the thin film transistor;
   providing a third shadow mask over the passivation layer, wherein the third shadow mask exposes a portion of the passivation layer; and
   applying a laser through the third shadow mask to irradiate the passivation layer for removing the exposed portion of the passivation layer.

10. The method for fabricating a pixel structure according to claim 1, wherein a method of forming the first conductive layer comprises a sputtering process or evaporation process.

11. The method for fabricating a pixel structure according to claim 1, wherein dose of the laser is in a range of 10-500 mJ/cm$^2$.

12. The method for fabricating a pixel structure according to claim 1, wherein a wavelength of the laser is in a range between 100 nm and 400 nm.

13. The method for fabricating a pixel structure according to claim 1, wherein the patterned passivation layer comprises is formed on a portion of the gate dielectric layer.

14. The method for fabricating a pixel structure according to claim 1, wherein the material of the patterned passivation layer comprises organic photoresist material.

15. The method for fabricating a pixel structure according to claim 1, further comprising simultaneously forming the gate and a lower-layer capacitor electrode, and simultaneously forming the source, the drain and an upper-layer capacitor electrode, wherein the lower-layer capacitor electrode and the upper-layer capacitor electrode together constitute a storage capacitor.

16. The method for fabricating a pixel structure according to claim 1, wherein the substrate comprises glass or plastic.

17. The method for fabricating a pixel structure according to claim 1, wherein the channel layer comprises amorphous silicon (a-Si) or N-type doped amorphous silicon (a-Si).

18. The method for fabricating a pixel structure according to claim 1, wherein the first conductive layer comprises Cu, Al, Mo, Ti, Nd, MoN, TiN or a combination thereof.

19. The method for fabricating a pixel structure according to claim 1, wherein the source and the drain comprise Cu, Al, Mo, Ti, Nd, MoN, TiN or a combination thereof.

20. The method for fabricating a pixel structure according to claim 1, wherein the electrode material layer comprises indium tin oxide (ITO), indium zinc oxide (IZO) or high transparent material.

21. The method for fabricating a pixel structure according to claim 1, wherein a method of laser process further comprises using digital exposing mode to automatically position the laser beam and adjust the energy of the laser beam.

* * * * *